Dec. 31, 1935.   R. R. SHAFTER ET AL   2,026,441
CALCINER
Filed Nov. 28, 1933   3 Sheets-Sheet 1

INVENTORS
RULAND R. SHAFTER
RICHARD BERNHARD
BY Eugene H. Parks
their ATTORNEY.

Dec. 31, 1935.  R. R. SHAFTER ET AL  2,026,441
CALCINER
Filed, Nov. 28, 1933   3 Sheets-Sheet 2
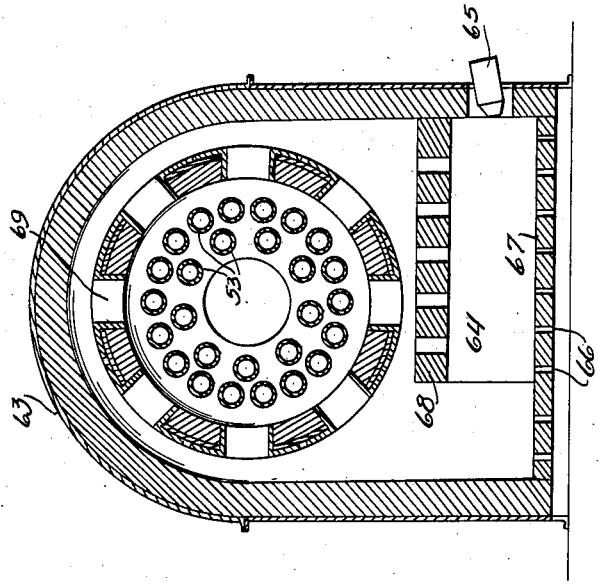
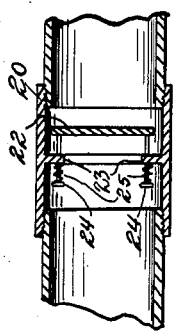
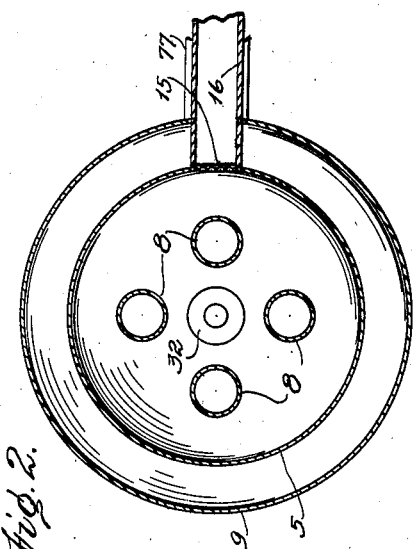
INVENTORS,
RULAND R. SHAFTER
RICHARD BERNHARD
BY Eugene H. Purdy
their ATTORNEY.

Dec. 31, 1935.  R. R. SHAFTER ET AL  2,026,441
CALCINER
Filed Nov. 28, 1933  3 Sheets-Sheet 3
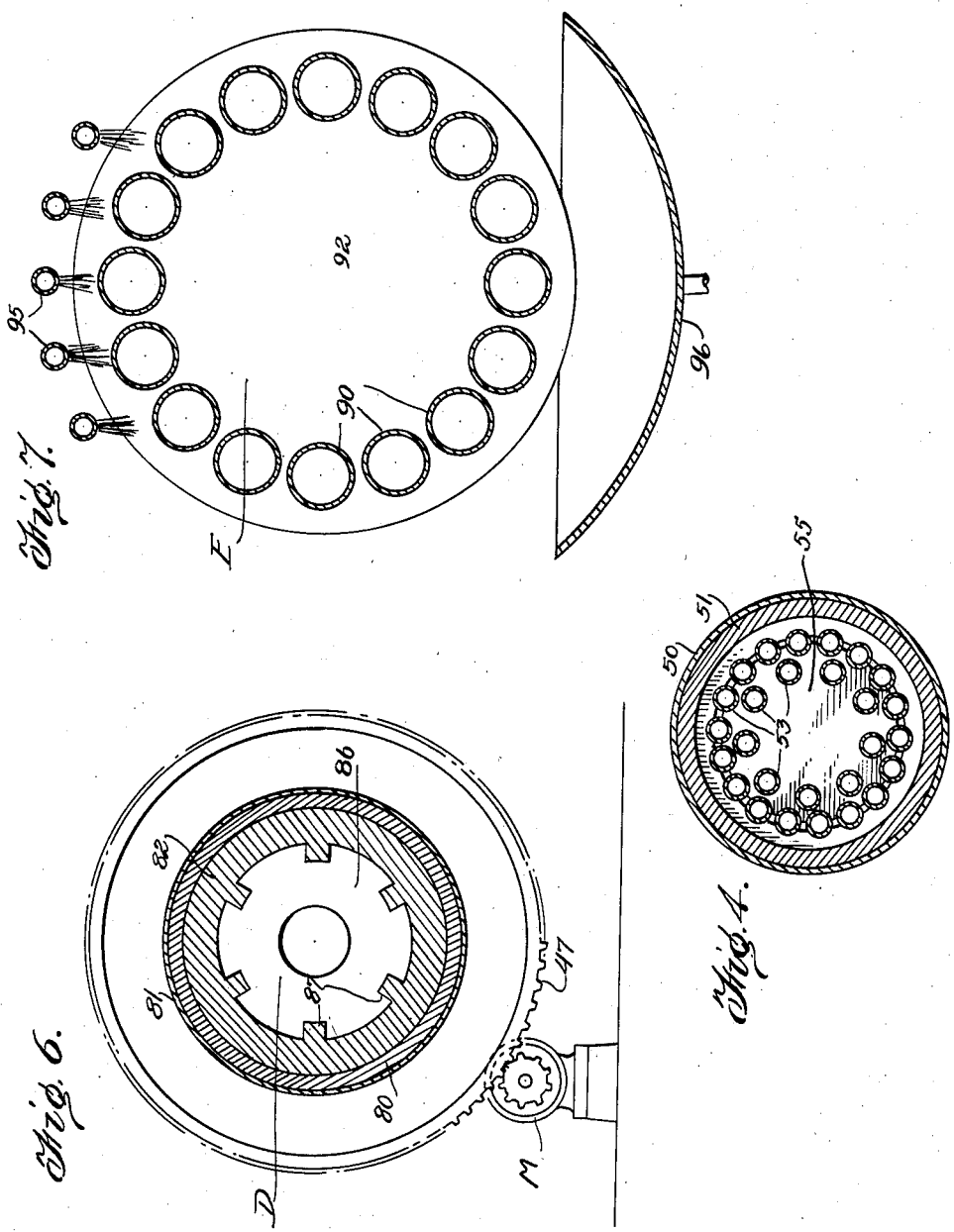
INVENTORS
RULAND R. SHAFTER
RICHARD BERNHARD
BY Eugene H. Purdy
Their ATTORNEY.

Patented Dec. 31, 1935

2,026,441

UNITED STATES PATENT OFFICE 2,026,441

CALCINER

Ruland R. Shafter, Freeport, N. Y., and Richard Bernhard, Allentown, Pa., assignors to Traylor Engineering & Manufacturing Company, a corporation of Delaware Application November 28, 1933, Serial No. 700,154

8 Claims. (Cl. 263—32)

This invention relates to calcining and more especially to the calcining of earthy minerals, such as the carbonates of calcium and magnesium. The present application is a continuation-in-part of our copending application, Serial No. 700,155 filed November 28, 1933, now Patent No. 1,995,948, dated March 26, 1935, in which copending application is described and claimed a kiln in many respects similar to the one forming a component of the apparatus described herein.

The object of our invention is to provide a calciner particularly useful for the treatment of minerals which when heated liberate a gas. In the case of the carbonates, the gas so liberated is carbon dioxide which finds many industrial applications. The lime produced by burning limestone likewise has a wide range of utility, and especially so when it is perfectly clean and pure. Up to the present time, however, the calcining of limestone has been attended with several difficulties. When the calcination takes place in the vertical tower type of kiln, as is quite common practice, the carbon dioxide gas commingles with the fuel gases of the flame employed to fire the kiln and is permitted to escape to the atmosphere. Furthermore the lime exposed as it is to these fuel gases is contaminated thereby, and is frequently lacking in homogeneity by reason of imperfect and unequal heating. As a result, the carbon dioxide gas is merely a waste product and the lime produced is unsuited for many purposes without further purification which adds to the cost of manufacture.

While the above shortcomings and disadvantages have been attempted to be overcome by heating the lime in a closed retort, this has not proved successful because of the relatively great amount of time required for processing limestone in comercial quantities due to the necessity for interrupting the operation to discharge and recharge the retorts. Furthermore the heat losses occasioned thereby are quite substantial, so that those two objections alone more than offset the advantage gained by the recovery of the carbon dioxide gas and the lime in a pure state.

According to our invention we provide an apparatus for the calcination of limestone and similar minerals which consists in general of a gas-tight system through which the material undergoing treatment is continuously progressed and in which both the burned lime and the carbon dioxide liberated by the limestone are maintained out of contact with the fuel gases used to heat the apparatus.

The calciner is composed of a rotary kiln, a soaking drum and a cooler all rigidly connected together in series for unitary rotation and affording means for continuously progressing crushed limestone through these three units. The kiln is provided with a series of muffle tubes open at their ends and extending longitudinally through the kiln. The kiln has its rear end enclosed within and communicating with a combustion chamber and its forward end projecting within a closed housing connected with an exhaust fan so that the fuel gases flowing through the kiln from the combustion chamber to the housing give up a substantial portion of their heat to the muffle tubes containing the limestone. The lime leaving the kiln at a high temperature enters a rotary soaking drum where it is tumbled about and permitted to "soak" in its own heat for a prescribed interval of time thereby insuring an even distribution of heat throughout the mass and resulting in a uniform product. From the soaking drum the burned lime enters a cooler which lowers its temperature before being discharged into a stationary hopper at the end of the calciner.

Important features of the invention are the arrangement whereby the soaking drum and cooler are sealed against the fuel gases flowing through the kiln and against the outside atmosphere; the arrangement of the kiln, soaking drum and cooler in a unitary rotary structure whereby the material undergoing treatment is maintained in a state of flux during its passage through these three units; and the novel means provided for the advancement of the material from one unit to another during their rotation.

A suction fan may be advantageously employed for withdrawing the evolved carbon dioxide gas from the system, and in accordance with the preferred mode of operating the apparatus this fan is driven at a speed such as to maintain a sub-atmospheric pressure within the system thus contributing to the more rapid evolution of carbon dioxide gas and insuring the complete processing of the lime by the time it reaches the cooler.

Since it is an object of the invention to recover the carbon dioxide in a very pure state substantially free of dirt and from dilution with other gases, it is necessary that the greater part of the moisture, air and dust accompanying the limestone should be removed before its introduction into the kiln. Accordingly, in the preferred form of the invention, a receptacle is provided into which the limestone is initially charged before entering the kiln and which serves as a drier for the limestone. This receptacle is exteriorly heated by the hot fuel gases drawn from the combustion chamber of the furnace which act to drive off moisture from the limestone contained therein. This moisture together with such dust as accompanies the limestone is removed by an exhaust fan connected to the receptacle.

The invention will be better understood from the following detailed description of a calcining apparatus representing a preferred embodiment thereof, reference being had to the accompanying drawings in which:

Figure 2 is a horizontal cross-section of the drier taken on the line 2—2 of Fig. 1;

Figure 3 is a detail sectional view of the automatic shut-off gate employed in the exhaust conduit;

Figure 4 is a transverse cross-section of the kiln on the line 4—4 of Fig. 1;

Figure 5 is a vertical cross-section of the furnace surrounding the end of the kiln, taken on the line 5—5 of Fig. 1;

Figure 6 is a vertical cross-section of the soaking drum on the line 6—6 of Fig. 1; and Figure 7 is a transverse cross-section of the cooler on the line 7—7 of Fig. 1.

Figure 1:
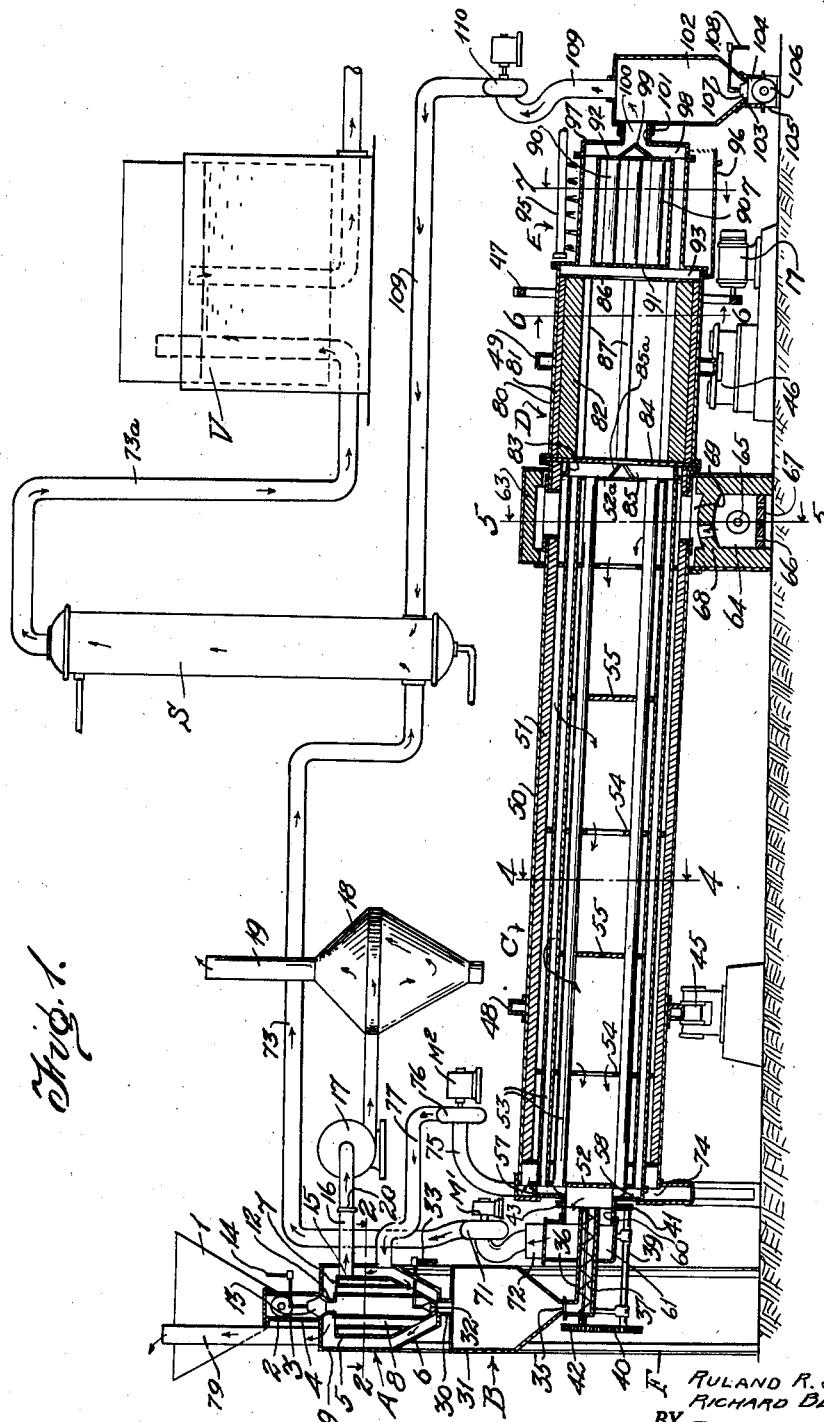
Figure 1 is a longitudinal cross-sectional view of the lime burning apparatus, shown somewhat diagrammatically, including drier, feed bin, kiln, soaking drum and cooler.

The lime burning apparatus shown in Fig. 1 comprises five major components, namely, a drier A, a feed bin B, a kiln C, a soaking drum D, and a cooler E, all arranged in series and in communicating relationship to permit the material to be progressed from one unit to another. The drier A and feed bin B are supported upon a steel frame F made up of structural members rigidly connected together as shown. Limestone, crushed into fragments finer than ½ inch in size and contained within a storage bin 1, is fed from the bottom of this bin by a screw conveyor 2, operating within a horizontal trough 3, to a downspout 4. This downspout communicates at its lower end with the top of the drier A.

The drier A comprises an upright cylindrical receptacle 5 having a downwardly tapered bottom 6 and a flat cover 7, and extending vertically between the bottom 6 and the cover 7 is a series of open-ended heating tubes 8 spaced equidistantly apart in the manner shown in Fig. 2. The receptacle 5 is enclosed within a jacket 9 corresponding in shape to that of the receptacle but sufficiently oversize to provide a heating space surrounding the receptacle. A neck 12 extending between the lower end of downspout 4 and the cover 7 of receptacle 5 provides a passage for the discharge of limestone from the downspout into the receptacle, and a valve 13, manipulable by a hand lever 14, allows the opening and closing of this passage.

Intersecting the jacket 9 and communicating with the receptacle 5 through a screened area 15 forming a part of the wall of the receptacle is a conduit 16, the opposite end of which is connected to an exhaust fan 17 which discharges to atmosphere through a dust collector 18 of the cyclone type and thence through a vertical vent pipe 19.

A shut-off gate 20 is interposed within the conduit 18 so that when the exhaust fan 17 stops, the gate automatically closes and prevents air from entering the receptacle via the vent pipe 19. The construction of one form of gate which advantageously may be used is shown in Fig. 3. As indicated in this figure, a circular valve 22 is normally held seated against an internal annular flange 23 through the influence of relatively weak springs 24 surrounding headed pins 25 which latter are attached to the valve and slidable within openings in the flange, the arrangement being such that when pressure upon the right hand side of the valve (Fig. 3) is reduced by the suction created by the fan 17, the valve opens in opposition to the springs 24; but when the fan is stopped, atmospheric pressure, aided by the springs, reseats the valve to close the line.

Located immediately below the drier A and communicating therewith through a short neck 30 is a feed bin B comprising a receptacle 31 for holding a reserve of limestone. The neck 30 is provided with a valve 32, operable by a hand lever 33, which may be opened and closed from time to time to replenish the supply of material in the bin. The bin is provided with an outlet 35 at its bottom through which the limestone feeds into one end of a horizontal conveyor pipe 36 where it is urged by a screw conveyor 37 into the forward end of the horizontal rotary kiln C.

The screw conveyor 37 is driven from a counter shaft 39 carrying upon its opposite ends gears 40 and 41, the former of which meshes with a companion gear 42 on the screw conveyor drive shaft and the latter of which engages a ring gear 43 upon the kiln. In this way the speed of the conveyor is synchronized with the speed of rotation of the kiln.

The kiln C, the soaking drum D and the cooler E are all of the rotary type and are rigidly connected together in the form of an elongated cylindrical structure disposed at a slight inclination to the horizontal so as to permit the gravitational feed of material therethrough. The structure is freely supported upon roller bearings 45 and 46 engaging tires 48 and 49 encircling respectively the kiln and the soaking drum. These bearings are so arranged as to act as thrust members to prevent axial shifting of the inclined structure. The apparatus is revolved by a motor M which makes driving connection with the apparatus through a ring gear 47 girdling and rigidly fastened to the soaking drum.

The kiln C, a sectional view of which is shown in Fig. 4, is formed of an outer shell 50 having a lining 51 of a refractory material, such as fireclay; and passing lengthwise through the kiln, their ends being mounted in headers 52 and 52a at opposite ends of the kiln, is a series of muffle tubes 53. These tubes each defining an elongated passage for the movement of limestone, are additionally supported at spaced intervals by baffle rings 54, suitably recessed to pass the tubes, and secured to the lining of the kiln. Midway between the rings and supported upon the tubes are circular baffle disks 55 of less diameter than the inner circumference of the kiln so as to afford clearance passages around the edges of the disks. The arrangement of the baffle rings and disks is such as to cause the hot gases flowing at a high velocity through the kiln, as will later be explained, to follow an undulating or staggered path, as indicated by the arrows in Fig. 1, so as to cross and recross the muffle tubes a number of times during their passage through the kiln and give up a maximum amount of their heat to the tubes. Welded to the header 52 at the front end of the kiln is a cap 57 defining a closed chamber in communication with the tubes 53 for the reception of limestone delivered thereinto by the screw conveyor 37. This cap is interiorly provided with a series of radial vanes or elevators 58, which, during rotation of the kiln, raise and deflect the limestone from the chamber into the muffle tubes 53 the ends of which latter, it will be understood, open through the header 52. The cap 57 has a central inlet coinciding with the axis of rotation of the kiln. A sleeve 60 surrounds this inlet and provides a longitudinal extension thereof passing through the stationary wall of a gas chest 61. The gas chest is thus in communication with the chamber defined by the cap 57 whereby the carbon dioxide gas evolved by the limestone within the tubes 53 is permitted to flow freely through the sleeve 60 in the space surrounding the conveyor pipe 36 into the gas chest. A slip connection preferably provided between the rotatable sleeve 60 and the stationary wall of the gas chest 61 is suitably packed to effect a gas-tight seal between these two relatively movable parts.

Heat is supplied to the kiln by a furnace 63 which arches over and completely encloses a section of the kiln adjacent its rear end, that is the end opposite to that at which the limestone enters the kiln. This furnace, as best shown in Fig. 5, comprises a combustion chamber 64 in which fuel discharged from a burner 65 is burned in air drawn through inlets 66 from an air space located below a hearth 67 of the furnace. A perforated baffle 68 extending between the side walls of the furnace shields the kiln from the direct and more intense heat of the burner flame. The hot gaseous products of combustion pass up into the interior of the rotatable kiln through open slots 69 formed in the wall of the kiln at spaced intervals about its circumference. As indicated by the arrows in Fig. 1, these fuel gases after emerging from the slots sweep through the kiln towards its front end and give up a substantial portion of their heat to the muffle tubes 53 containing the limestone being advanced toward the rear end of the kiln. This causes the limestone to liberate carbon dioxide gas, and in order to promote this action a suction is created by an exhaust fan 71 connected through a coupling 72 communicating with the gas chest 61. This fan is driven by a motor M' at such a speed as not only to remove the carbon dioxide as quickly as it is produced but also to maintain a sub-atmospheric pressure within the tubes. The carbon dioxide withdrawn from the gas chest passes through a line 73 to a scrubber S and thence through line 73 to a storage vessel V.

The fuel gases containing a substantial amount of residual heat are withdrawn from the kiln at its forward end through the clearance space between the circumferential edge of the header 52, (which is of smaller diameter than the inside of the kiln) and the outer shell 50 of the kiln. The rear header 52a completely closes the rear end of the kiln and prevents the fuel gases from escaping from that end. These fuel gases pass from the kiln into a stationary annular housing 74 within which the forward end of the kiln is telescoped, a gas-tight connection being interposed between the housing and rotary kiln. These hot fuel gases are withdrawn from the housing 74 through a conduit 75 by an exhaust fan 76 driven at appropriate speed by a motor M² and delivered through another conduit 77 into the jacket 9 surrounding the receptacle 5 of the drier A. The fuel gases after circulating through the jacket are vented to the atmosphere through a flue 79 leading off from the top of the jacket.

Instead of passing directly to a cooler as is now customary practice, the limestone which will have been reduced to quick lime (CaO) during its travel through the kiln, is according to the present invention allowed to remain at a relatively high temperature for a prescribed interval of time. To this end the soaking drum D is rigidly connected to the rear end of the kiln and constitutes, in effect, a prolongation of the kiln. This drum has an outer shell 80 interiorly provided with a layer 81 of an insulating material, such as an asbestos composition, and a thick lining 82 of fireclay designed to conserve the heat within the drum. Intermediate the discharge end of the kiln and the forward end of the soaking drum is a small chamber for the reception of lime spilling from the open ends of the muffle tubes 53, this chamber being defined by the interposition of a spacing ring 83 between the header 52a at the rear end of the kiln and a centrally-apertured ring plate 84 at the forward end of the soaking drum. The spacing ring 83 is provided with radial vanes or elevators 85 directed toward a cone 85a centrally located on the header 52a, the arrangement being such that the lime issuing from the tubes 53 is caught up by these elevators during rotation of the kiln and caused to slide down upon the cone which deflects the material through a central opening in the ring plate 84 into the soaking drum. The rear end of the drum is also provided with a ring plate 86, corresponding to ring plate 84, and these two ring plates serve to confine between them a relatively thick bed of lime.

As best shown in Fig. 6, the lining upon the interior of the drum is provided with longitudinal ribs 87 which during rotation of the drum tumble the fragments of lime about so as to uniformly distribute the heat throughout the mass. This soaking drum while substantially shorter than the kiln, nevertheless is of sufficient length to allow ample time for the lime to thoroughly soak in its absorbed heat during its movement through the drum.

From the soaking drum, the lime enters the cooler E. This cooler is of the multi-tube type comprising a series of cooling tubes 90 arranged in circular formation, as illustrated in Fig. 7, and having their ends opening through and connected to front and rear headers 91 and 92, respectively. The front header 91 closes the end of the soaking drum D to which it is rigidly attached so that the cooler rotates in unison with the drum. The lime issuing from the drum passes into a small chamber 93 between the ring plate 86 at the rear of the soaking drum and the header 91 at the front end of the cooler. From this chamber the lime passes into the cooling tubes 90. Above the cooler is a number of spray pipes 95 from which cooling water discharges onto the tubes and this water drains into a catch pan 96 situated below the cooler. The end of the cooler is closed by a cap 97 providing a space immediately behind the rear header 92 for the reception of material issuing from the ends of the tubes 90. This cap, like the rear spacing ring 83 previously described, is provided with radial vanes or elevators 98 which, during rotation of the cooler, direct the material against a cone 99 that in turn deflects it through a central discharge opening 100 in the cap 97.

A cylindrical spout 101 coinciding with the axis of rotation of the cooler constitutes an axially-directed extension of this opening and passes through the wall of a discharge hopper 102, a gas-tight slip connection being interposed between the rotatable spout and stationary discharge hopper. The discharge hopper 102 is provided with an outlet 103 located within its tapered bottom which communicates through a neck 104 with a trough 105 in which operates a screw conveyor 106 for continuously removing the calcined lime from the hopper. A valve 107 operable by a hand lever 108 permits the outlet 103 to be opened and closed. A conduit 109 leading from the top of hopper 102 and having an exhaust fan 110 connected therewith serves for the removal of whatever carbon dioxide may be carried over into the soaking drum and cooler and delivers the same to the scrubber S.

The apparatus which has been described defines a gas-tight system in which the carbon dioxide liberated by the limestone, as well as the limestone itself, is kept segregated from the gaseous products of combustion of the furnace. The operation of the apparatus is as follows: After the furnace has been fired and the motor M set in operation to rotate the apparatus, the attendant in charge turns the hand lever 14 to open the valve 13 and the hand lever 33 to close the valve 32. The screw conveyor 2 is then operated to feed limestone from the storage bin 1 into the drier A until the latter is substantially filled after which the conveyor is stopped and the valve 13 is closed. The exhaust fan 17 is next started to pull off such dust as may accompany the limestone into the drier as well as the moisture which is driven off from the limestone by the heat of the fuel gases circulating through the jacket 9 surrounding the drier.

After a suitable interval, the fan 17 is stopped and valve 32 opened to permit the charge of material in the drier to descend into the feed bin B. Then this valve is again closed and the valve 13 at the top of the drier opened, allowing the receptacle 5 to be refilled.

The limestone is removed from the bottom of the feed bin and discharged into the more elevated end of the rotating kiln by the screw conveyor 37 driven from the kiln. The limestone entering the kiln advances through the muffle tubes 53 under the combined influence of gravity and the vibrating motion imparted to the kiln as a result of its rotation toward the calcining zone of the kiln during which its temperature is gradually raised by reason of the heat imparted to the tubes from the fuel gases flowing along and across these tubes towards the front end of the kiln.

When the limestone reaches the section of the kiln which revolves within the combustion chamber 64 of the furnace 63, defining the calcining zone of the kiln, it will be intensely heated and transformed into lime by the hot fuel gases which flow directly from the combustion chamber through the slots 69 in the kiln into contact with the tubes 53. Any carbon dioxide gas which has not previously been liberated from the material will now be driven off and a high temperature imparted to the lime. This carbon dioxide is withdrawn by the exhaust fan 71 from the tubes 53 into the gas chest 61 and delivered to the scrubber S and storage vessel V.

Emerging from the kiln, the hot burned lime passes into the soaking drum D and during the interval of its travel therethrough will soak in its own heat. The material is tumbled about by the ribs 87 during rotation of the drum and the heat uniformly distributed throughout the mass which contributes to the homogeneity of the product.

From the soaking drum, the lime enters the tubes 90 of the cooler E which tubes, during revolution of the cooler, are brought under the spray pipes 95 and showered with cooling water to cool the lime inside the tubes. After the relatively short time required for the journey of the lime through the cooler, resulting in a sharp reduction in its temperature, the lime leaves the cooler through the sleeve 101 and passes into the closed discharge hopper 102. The lime, containing only a comparatively small amount of residual heat, builds up upon the bottom of the hopper (the valve 107 having been previously closed when the apparatus was set in operation). When the material covers the bottom of the hopper, the valve 107 is opened by turning the hand lever 108 and the screw conveyor 106 is operated so as to remove material from the bottom of the hopper at the same rate at which it is being fed in at its top. The deposit of lime upon the bottom of the hopper prevents any appreciable infiltration of air by way of the outlet 103.

Various modifications in structure and design may be made without departing from the spirit of the present invention. The invention is not restricted to the burning of lime or magnesium—although it possesses particular utility in that connection—but may be applied to good advantage in the treatment of other earthy minerals, such as cement and ceramic materials, and ores. Nor is it necessary that the calcination be carried on under sub-atmospheric pressure, if this for any reason should prove impracticable or undesirable, but the fan for exhausting carbon dioxide from the muffle tubes may be operated at sufficiently low speed so as to simply carry off the evolved gas as it is formed. Instead of the manual operation of the valves 13, 32 and 107, as described, electric switch operation may be substituted as will be readily appreciated.

We claim:

1. A calciner comprising a combustion chamber, a horizontal rotary kiln having its rear end extending into and communicating with said combustion chamber, a plurality of tubes passing longitudinally through the kiln for containing material to be calcined, means for introducing material into the tubes at the forward end of the kiln, a soaking drum having a heat-insulating wall rigidly connected to the kiln and adapted to receive material discharging from the tubes at the rear end of the kiln, said soaking drum constituting in effect a prolongation of the kiln and being sealed against the atmosphere and against the combustion gases flowing through the kiln, and means for rotating the kiln and soaking drum as a unit.

2. A calciner comprising a combustion chamber, a horizontal rotary kiln having its rear end extending into and communicating with said combustion chamber, a plurality of tubes passing longitudinally through the kiln for containing material to be calcined, means for introducing material into the tubes at the forward end of the kiln, a soaking drum having a heat-insulating wall rigidly connected to the rear end of the kiln and adapted to receive material discharged from the tubes, a gas-tight partition interposed between the kiln and soaking drum for preventing combustion gases from entering the soaking drum, and means for rotating the kiln and soaking drum as a unit.

3. A calciner comprising a horizontal kiln mounted for rotation and having an entrance end and a discharge end, a muffle tube connected to and passing longitudinally through the kiln for containing material to be calcined, a combustion chamber enclosing and communicating with the discharge end of the kiln, a soaking drum rigidly connected to the discharge end of the kiln adjacent the combustion chamber, and adapted to receive material spilling from the muffle tube, said soaking drum having a wall of heat-insulating material thicker than the wall of the kiln, and means to rotate the kiln, muffle tube and soaking drum as a unit.

4. A calciner comprising a horizontal kiln mounted for rotation and having an entrance end and a discharge end, a series of muffle tubes arranged in relatively widely spaced relation connected to and passing longitudinally through the kiln for containing material to be calcined, a combustion chamber enclosing and communicating with the discharge end of the kiln, a soaking drum rigidly connected to the end of the kiln adjacent the combustion chamber and adapted to receive material spilling from the muffle tubes, said soaking drum having a wall of heat-insulating material thicker than the wall of the kiln, and means to rotate the kiln, muffle tubes and soaking drum as a unit.

5. A calciner comprising a horizontal kiln mounted for rotation and having an entrance end and a discharge end, a muffle tube connected to and passing longitudinally through the kiln for containing material to be calcined, a combustion chamber enclosing and communicating with the discharge end of the kiln, a soaking drum rigidly connected to the discharge end of the kiln adjacent the combustion chamber and adapted to receive material spilling from the muffle tube, said soaking drum having a wall of heat-insulating material thicker than the wall of the kiln, and means to rotate the kiln, muffle tube and soaking drum as a unit, said soaking drum being of smaller internal diameter than the kiln.

6. A calciner comprising a horizontal kiln mounted for rotation and having an entrance end and a discharge end, a muffle tube connected to and passing longitudinally through the kiln for containing material to be calcined, a combustion chamber enclosing and communicating with the discharge end of the kiln, a soaking drum rigidly connected to the discharge end of the kiln adjacent the combustion chamber and adapted to receive material spilling from the muffle tube, said soaking drum having a wall of heat-insulating material thicker than the wall of the kiln, and means to rotate the kiln, muffle tube and soaking drum as a unit, the wall of said soaking drum being composed of an outer metallic shell, an intermediate layer of asbestos composition and a relatively thick lining of refractory material.

7. A calciner comprising a horizontal kiln mounted for rotation and having an entrance end and a discharge end, a muffle tube connected to and passing longitudinally through the kiln for containing material to be calcined, a combustion chamber enclosing and communicating with the discharge end of the kiln, a soaking drum rigidly connected to the discharge end of the kiln adjacent the combustion chamber and adapted to receive material spilling from the muffle tube, said soaking drum having a wall of heat-insulating material thicker than the wall of the kiln, and means to rotate the kiln, muffle tube and soaking drum as a unit, said soaking drum having internal flanges at opposite ends for confining a relatively thick layer of material upon the floor of the drum.

8. A calciner comprising a horizontal kiln mounted for rotation and having an entrance end and a discharge end, a muffle tube connected to and passing longitudinally through the kiln for containing material to be calcined, a combustion chamber enclosing and communicating with the discharge end of the kiln, a soaking drum rigidly connected to the discharge end of the kiln adjacent the combustion chamber and adapted to receive material spilling from the muffle tube, said soaking drum having a wall of heat-insulating material thicker than the wall of the kiln, and means to rotate the kiln, muffle tube and soaking drum as a unit, said soaking drum having ribs upon its interior for agitating the material during its passage therethrough.

RULAND R. SHAFTER.
RICHARD BERNHARD.